(12) United States Patent
Barnett

(10) Patent No.: US 9,169,730 B2
(45) Date of Patent: Oct. 27, 2015

(54) FAN HUB DESIGN

(75) Inventor: Barry Barnett, Markham (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 647 days.

(21) Appl. No.: 13/297,300

(22) Filed: Nov. 16, 2011

(65) Prior Publication Data

US 2013/0121834 A1     May 16, 2013

(51) Int. Cl.
*F01D 5/14* (2006.01)
*F02K 3/06* (2006.01)

(52) U.S. Cl.
CPC .... *F01D 5/14* (2013.01); *F02K 3/06* (2013.01)

(58) Field of Classification Search
CPC ............... F01D 5/00; F01D 5/02; F01D 5/14; F01D 5/147; F01D 5/34; F01D 25/04; F01D 25/06; F02K 3/06
USPC ...... 416/180, 193 A, 193 R, 234, 235, 236 R, 416/210 R, 219 R, 220 R, 244 R, 248, 244 A, 416/204 A
See application file for complete search history.

(56) References Cited

U.S. PATENT DOCUMENTS

| | | |
|---|---|---|
| 2,445,661 A | 7/1948 | Constant et al. |
| 2,928,649 A | 3/1960 | Lombard et al. |
| 3,323,710 A | 6/1967 | Daly |
| 3,428,244 A * | 2/1969 | Palmer .......................... 415/220 |
| 3,869,258 A | 3/1975 | Scott |
| 4,934,904 A | 6/1990 | Kennedy |
| 5,108,261 A | 4/1992 | Ress, Jr. et al. |
| 6,019,580 A | 2/2000 | Barr et al. |
| 6,077,035 A | 6/2000 | Walters et al. |
| 6,354,780 B1 | 3/2002 | Davis et al. |
| 6,390,775 B1 | 5/2002 | Paz |
| 6,447,252 B1 | 9/2002 | Barker et al. |
| 6,511,294 B1 | 1/2003 | Mielke et al. |
| 6,893,222 B2 | 5/2005 | Allam |
| 7,153,102 B2 | 12/2006 | Stone |
| RE39,630 E | 5/2007 | Stangeland et al. |
| 7,476,080 B2 | 1/2009 | Sato et al. |
| 2005/0186080 A1 * | 8/2005 | Chivers et al. ............ 416/223 R |
| 2012/0148401 A1 * | 6/2012 | Kulathu et al. ................... 416/1 |

* cited by examiner

*Primary Examiner* — Edward Look
*Assistant Examiner* — Danielle M Christensen
(74) *Attorney, Agent, or Firm* — Norton Rose Fulbright Canada LLP

(57) ABSTRACT

A fan rotor has a fan web and a plurality of circumferentially spaced-apart fan blades extending radially outwardly from an outer rim of the fan web. The outer rim is integrally connected to an inner rim through an axially facing web section. The web section has an inward concavature and extends aft of the center of gravity of the fan blades to shift the center of gravity of the hub rearwards while maintaining airfoil stress below critical levels. The rim section may have an inwardly projecting annular channel formed in a leading edge thereof and tuned to the 2M3ND mode of the fan hub.

8 Claims, 2 Drawing Sheets

FAN HUB DESIGN

TECHNICAL FIELD

The present application relates to gas turbine engines and, more particularly, to a fan hub design.

BACKGROUND ART

Fan hub designs are routinely optimized to meet various criterias. Such criterias include uniform radial hub displacement, hub fatigue stress, tooling access for machining, oil drainage, air foil fillet stress, burst speed and weight minimization.

SUMMARY

According to one aspect, there is provided a fan blade hub for a gas turbine engine compressor. The fan blade hub has a plurality of fan blades secured in spaced-apart relationship about an outer surface of a rim section of the fan blade hub. The rim section is integrally connected to a central neck section through a web section. The web section has an inward concavature and extends aft of the center of gravity of the fan blades to shift the center of gravity of the hub rearwards to reduce airfoil stresses. The rim section has a lower surface merging uninterrupted into a front upper curved surface of the web section.

According to a still further broad aspect, there is provided a fan blade hub for a gas turbine engine compressor. The fan blade hub has a plurality of fan blades secured in spaced-apart relationship about a rim section of the hub. The rim section is integrally connected to a central neck section through a web section. The rim section has an inwardly projecting annular channel formed in a leading edge thereof tuned to the 2M3ND mode of the fan blade hub and providing a reduction of airfoil stresses in the leading edge.

BRIEF DESCRIPTION OF THE DRAWINGS

Reference is now made to the accompanying figures in which.

DESCRIPTION OF THE PREFERRED EMBODIMENTS

Figure 1:
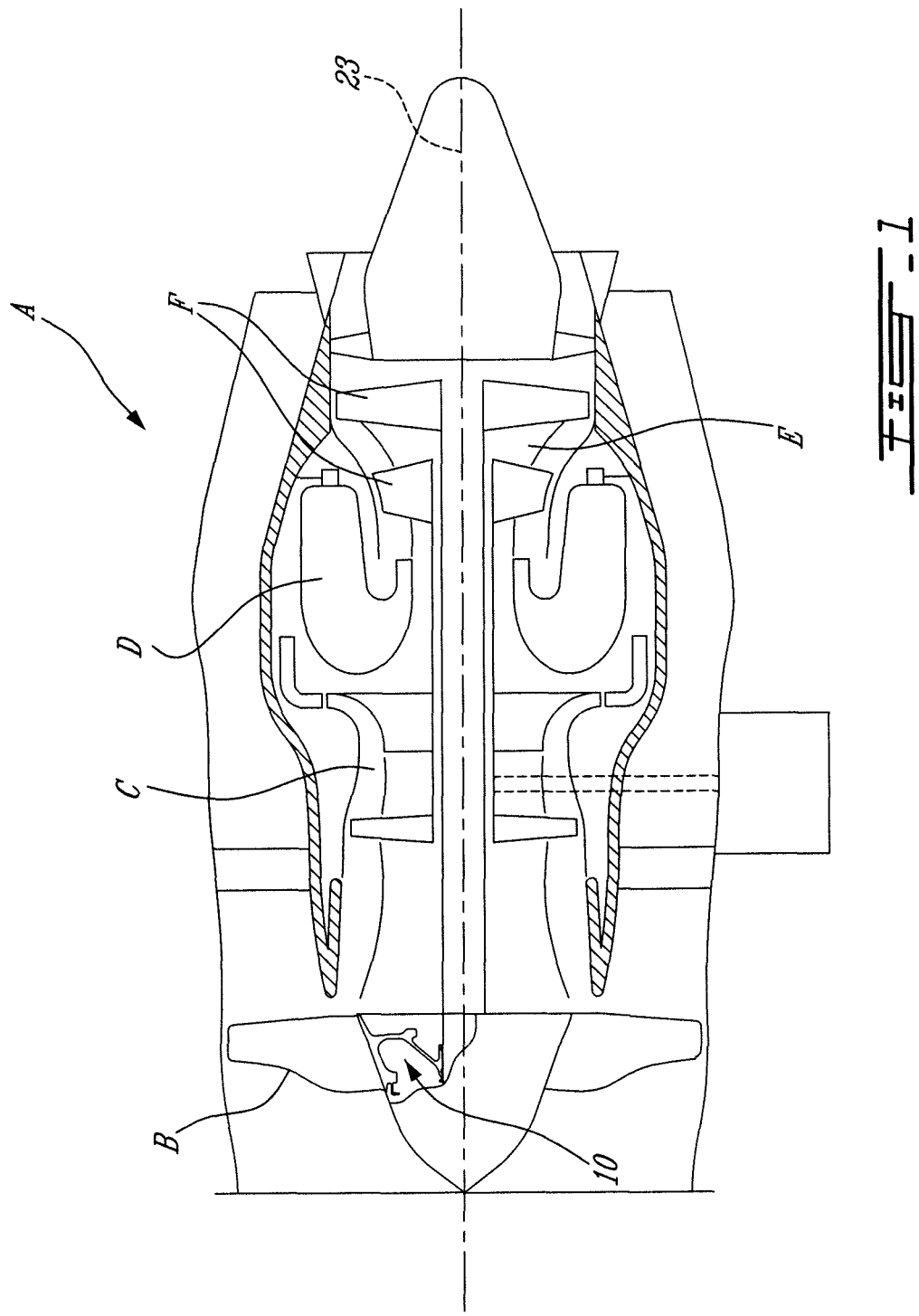
FIG. 1 is a schematic cross-sectional view of a gas turbine engine illustrating the location of the hub of the fan rotor in the compressor section of the engine.

FIG. 1 illustrates a turbo fan gas turbine engine A of a type preferably provided for use in subsonic flight, and generally comprising in serial flow communication a fan section B through which ambient air is propelled, a multi-stage compressor C for pressurizing the air, a combustor D in which the compressed air is mixed with fuel and ignited for generating an annular stream of hot combustion gases, and a turbine section E in which a series of rotating blades F are located and driven by the hot combustion gases.

Figure 2:
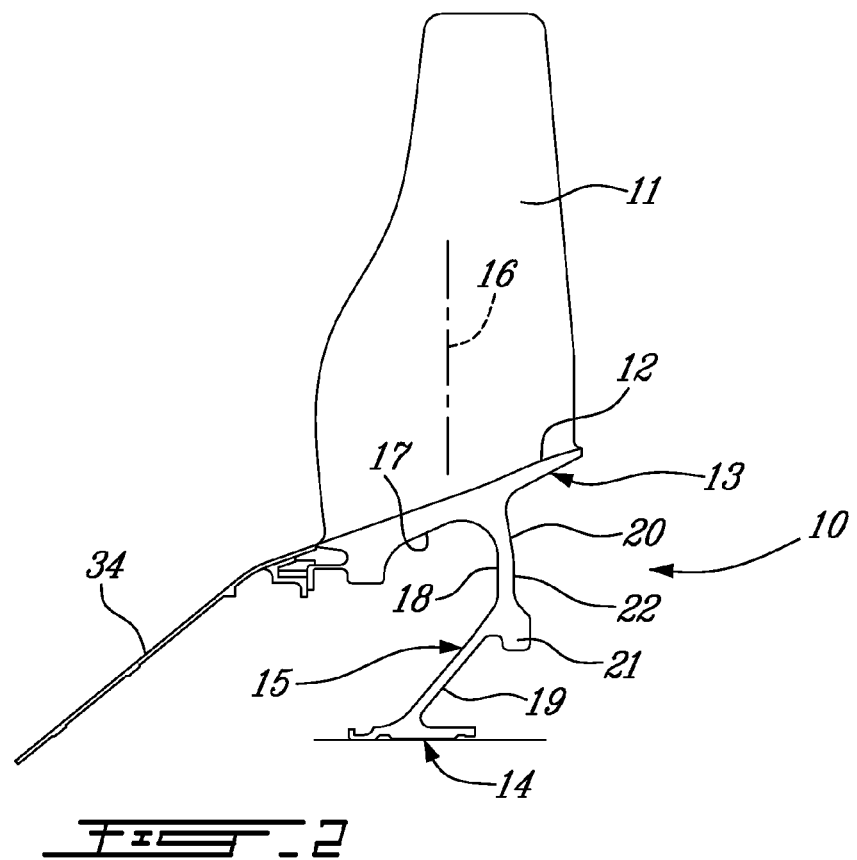
FIG. 2 is a cross-section view of the fan rotor illustrating the geometry of an embodiment of the fan hub and the axial position thereof with respect to the center of gravity of the fan blades.

As shown in FIG. 2, the fan section B comprises a fan rotor comprising a fan hub 10 carrying a circumferential array of fan blades 11. The fan rotor may be provided in the form of an integrally bladed rotor (IBR also known as blisk) or in the form of a rotor assembly comprising a disc having slots defined in a peripheral rim thereof for removably receiving the roots of fan blades.

The fan hub 10 illustrated in FIGS. 2 and 3 will now be described in more details. The fan hub 10 is a single casted or machined piece and has a plurality of fan blades 11 secured in circumferentially spaced-apart relationship about the outer surface 12 of an annular outer rim section 13 of the fan blade hub 10. The rim section 13 is integrally connected to an inner rim section 14 through an axially facing web section 15. The web section 15 has an inward concavature and extends axially aft of the center of gravity 16 of the fan blades 11 to shift the center of gravity of the hub 10 rearwards while maintaining low airfoil stresses. The rim section 13 has a radially inner surface 17 which merges uninterrupted into a front axially facing curved surface 18 of the web section 15.

The concavature of the web section 15 is provided by a radially inner web portion 19, which is angled rearwardly in a radially outer direction away from the inner rim section 14 and merging into the outer rim section 13 through a generally radial and forwardly curved radially outer web or neck portion 20 which is disposed aft of the center of gravity 16 of the airfoil blades. Both the web portion 19 and the neck portion 20 have radial and axial components. The axial components of the web portion 19 and of the neck portion 20 extend in opposed directions. The radially inner web portion 19 merges into the forwardly curved radially outer neck portion 20 in a reinforced web region formed by an annular projecting ridge formation 21 projecting from a rear surface 22 of the web section 15. The central neck section 14 is disposed parallel to the centerline 23 of the gas turbine engine, as shown in FIG. 1, and is provided with securing formations 24 for attachment to the low pressure shaft of the gas turbine engine.

Figure 3:
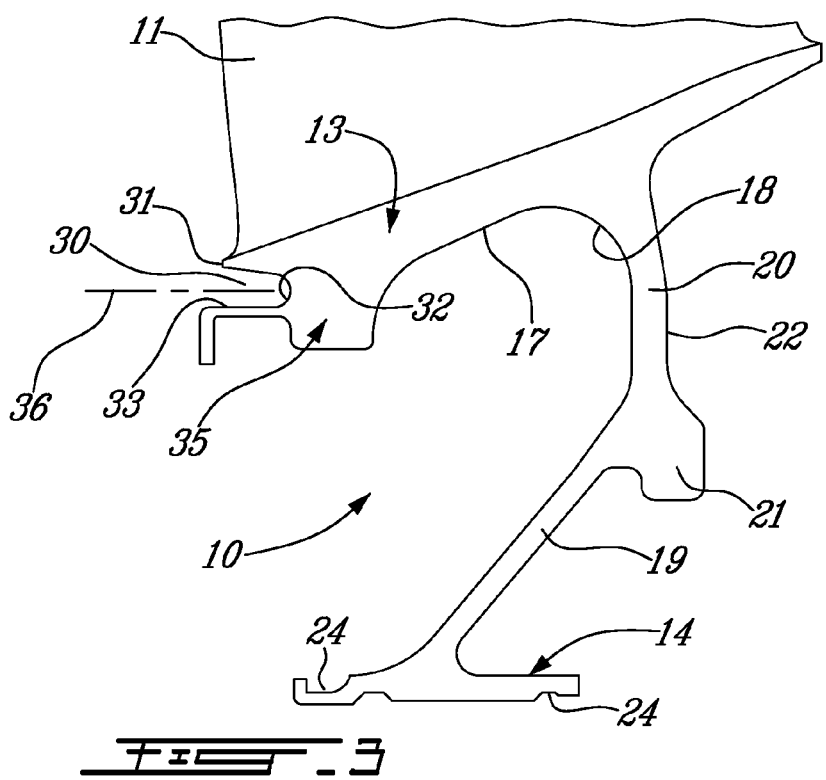
FIG. 3 is an enlarged cross-section view showing details of the fan hub shown in FIG. 2.

As better shown in FIG. 3, the outer rim section 13 is further provided with an axially inwardly projecting annular channel 30 formed in a leading edge 31 of the rim section. The annular channel 30 is essentially axial. This annular channel 30 is provided to relieve leading edge airfoil stresses. As hereinshown, the annular channel 30 is of substantially U-shaped cross-section thereby defining a concavely shaped inner wall 32 and a radially inner annular flange wall or lip 33 for the attachment of an inlet cone thereto. A section 34 of the cone being illustrated in FIG. 2. The central longitudinal axis 36 of the channel 30 lies substantially parallel to the centerline 23 (see FIG. 1) of the engine.

As better seen from FIG. 3, the rim section 13 is further provided with a stiffening ridge formation 35 projecting radially inwardly from the front end portion of the rim 13 axially rearwardly of channel 30 to balance the leading edge 31 and to maintain the stresses in the leading edge low. It was demonstrated through analysis that the 2M3ND (airfoil second bending mode of vibrations) mode of vibration was very sensitive to the hub shape and by optimizing the design to that as illustrated in FIGS. 2 and 3 resulted in reduced airfoil stresses in the leading edge 31 of the hub 10.

The above described embodiment provides a hub shape wherein the center of gravity of the hub is rearward relative to conventional hub designs. It can also be appreciated that the hub front end shaped is tuned to the 2M3ND mode to maintain the leading edge stresses low.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. An integrally bladed fan rotor for a gas turbine engine having a central axis, comprising a fan hub mounted for rotation about said central axis, and a plurality of fan blades circumferentially distributed about a radially outer surface of an outer rim section of said fan hub, said fan blades projecting integrally from said outer rim section, said outer rim section being integrally connected to an inner rim section through an axially facing web section, said web section having an inward concavature when looking in an axially rearward direction and extending axially aft of the center of gravity of the fan blades to shift the center of gravity of said hub axially rearwards, said outer rim section having a radially inner surface merging uninterrupted into a front radially outer curved surface of said web section, wherein said outer rim section is provided with an axially projecting annular channel formed in a leading edge thereof, and wherein said outer rim section is further provided with a stiffening ridge formation disposed axially rearwardly of said annular channel and projecting radially inwardly from the outer rim section.

2. The fan rotor as claimed in claim 1 wherein said concavature is comprised by a radially inner web portion projecting axially rearwardly in a radially outer direction from said inner rim section and merging into said outer rim section through a radially outer web portion which is inclined axially forwardly in a radially outer direction.

3. The fan rotor as claimed in claim 2 wherein said radially inner web portion merges into said radially outer web portion at a reinforced web region formed by an annular projecting ridge formation projecting from a rear surface of said web section.

4. The fan rotor as claimed in claim 2 wherein said inner rim section extends parallel to the central axis of the engine.

5. The fan rotor as claimed in claim 1 wherein said annular channel is of substantially U-shape cross-section defining a concavely shaped inner wall and a radially inner annular flange wall for the attachment of an inlet cone thereto.

6. An integrally bladed fan rotor for a gas turbine engine having a central axis, comprising a fan hub adapted to be mounted for rotation about the central axis of the engine, and a plurality of circumferentially spaced-apart fan blades extending integrally radially outwardly from an outer rim section of said fan hub, said outer rim section being integrally connected to an inner rim section through an axially facing web section, said outer rim section having an axially projecting annular channel defined in a leading edge thereof, wherein said outer rim section is provided with a stiffening ridge formation projecting axially rearwardly and radially inwardly of said annular channel.

7. The fan rotor as claimed in claim 6 wherein said annular channel is of substantially U-shape cross-section defining a concavely shaped inner wall and a radially inner annular flange wall for the attachment of an inlet cone thereto.

8. The fan rotor as claimed in claim 7 wherein said U-shaped cross-section has a central longitudinal axis which extends substantially parallel to the central axis of the engine.

* * * * *